United States Patent [19]
Hacker

[11] Patent Number: 5,816,352
[45] Date of Patent: Oct. 6, 1998

[54] REMOTE CONTROL TOY

[76] Inventor: Brian A. Hacker, 10814 W. Morten Ave., Glendale, Ariz. 85307

[21] Appl. No.: 704,985

[22] Filed: Aug. 29, 1996

[51] Int. Cl.[6] ....................................................... B60T 7/16
[52] U.S. Cl. .......................... 180/167; 180/430; 280/95.1
[58] Field of Search .................................. 446/456, 460; 280/95.1, 93; 180/430, 167

[56] References Cited

U.S. PATENT DOCUMENTS

| 3,029,371 | 4/1962 | Saito | 180/167 |
|---|---|---|---|
| 3,095,937 | 7/1963 | Vulliet-Durand | 180/65.1 |
| 4,799,915 | 1/1989 | Lehmann et al. | 446/279 |
| 5,435,408 | 7/1995 | Sekinobu | 180/184 |
| 5,439,071 | 8/1995 | Rodriguez-Ferre | 180/167 |
| 5,598,897 | 2/1997 | Sugiura | 180/430 |

*Primary Examiner*—J. J. Swann
*Assistant Examiner*—Avraham Lerner
*Attorney, Agent, or Firm*—Halvorson & Venable, P.C.

[57] ABSTRACT

A battery-powered toy vehicle permitting conversion between rider control and remote radio control is provided. A steering assembly attached to the underside of the toy vehicle is capable of being both remotely controlled by a radio controlled steering actuator, and rider controlled by a steering wheel. A switch effects the mechanism for converting between radio-control and steering wheel control.

16 Claims, 9 Drawing Sheets

REMOTE CONTROL TOY

FIELD OF THE INVENTION

The invention relates generally to remote control vehicles, and more particularly to a remote control riding toy vehicle assembly, wherein the riding toy vehicle is convertible from a first remote controlled mode, to a second rider controlled mode.

BACKGROUND

The lack of quality time between parents and children has become a popular lament lately. One reason for the reduction in shared time between the parents and children is that toys are designed for use primarily by children. Those toys that allow participation by parents are predominantly board games, which require a minimum level of maturity by the children. Because of this, it is extremely difficult for parents to meaningfully participate in their infant's or very young children's play.

Children's toys fall under two general classifications. A first class of toys are designed for children to play without adult participation. The second class of toys allow participation by adults.

One toy that falls under the first class is a riding toy vehicle. This toy is a miniature representation of a real or imaginary vehicle, but is large enough to allow for the child to ride the toy. Furthermore, these toys provide means for the riding child to operate the toy vehicle, such as steering and a drive pedal.

Since these toys are not large enough for adults to ride, they are limited to use by children mature enough not to require constant adult supervision. This means that an infant or very young child may not use these toy vehicles. Also, since adults cannot ride these vehicles with the children, they are limited to simply watching the child play with the toy. This quickly becomes tiresome and the adult leaves.

Another type of toy is remote controlled vehicles. These vehicles are also miniature representations of actual or imaginary vehicles. In these vehicles, a remote controller operates numerous drive and steering motors on the toy vehicle. Thus, a child, or even an adult, stands to one side and remotely controls the steering and direction of the toy vehicle.

To use this toy, the child must be of sufficient maturity to understand the theory of driving and the operation of the remote control. Unlike riding toy vehicles, adults may participate with the play in a limited fashion. Adults may operate a similar vehicle remotely, thus providing two remotely controlled toys that "play" with each other, or, the adults may take turns with the child in using the remote controller. Remote controlled toys, like riding toy vehicles, are not suitable for use by infants and very young children.

Both of the above toy classes are unsuitable for joint play participation with a single toy by an adult and a child. Furthermore, the above discussed toys, as they are currently marketed, cannot be played with, in any fashion, by an infant or very young child.

There is a need for a toy designed for cooperative play between adults and children. Furthermore, there is a need for a toy that allows an adult to play with infants and very young children. It would be especially useful if this toy were also convertible, such that as the child grows older, he/she may be able to play with the toy alone.

SUMMARY OF THE INVENTION

One of the purposes of the present invention is to provide a remote controlled riding toy vehicle. This riding toy vehicle features an ordinary riding vehicle that is well known in the art. The riding toy vehicle is modified to provide two modes of operation, a first remote controlled mode, and a second rider controlled mode.

It is another purpose of the present invention to provide a remotely controlled riding toy vehicle which allows both adults and children to play simultaneously, or cooperatively.

It is yet another purpose of the present invention to provide a toy that is readily convertible from a first mode of operation which is enjoyed by infants and very young children and adults, together, to a second mode of operation which may be enjoyed by older more mature children, alone.

It is still another purpose of the present invention to provide a remotely controlled riding toy vehicle in which an adult controls the steering and drive mechanisms of a riding toy vehicle, while a child rides on the riding toy vehicle.

BRIEF DESCRIPTION OF THE DRAWINGS

The above and still further objects, features and advantages of the present invention will become apparent upon consideration of the following detailed description of several specific embodiments, especially when incorporated with the accompanying drawings, wherein:

FIG. 1 depicts the present invention being used in its first mode by an adult and a very young child, simultaneously; while FIG. 2 depicts the present invention being used in its second mode by a more mature child;

DESCRIPTION OF PREFERRED EMBODIMENTS

Figure 1:
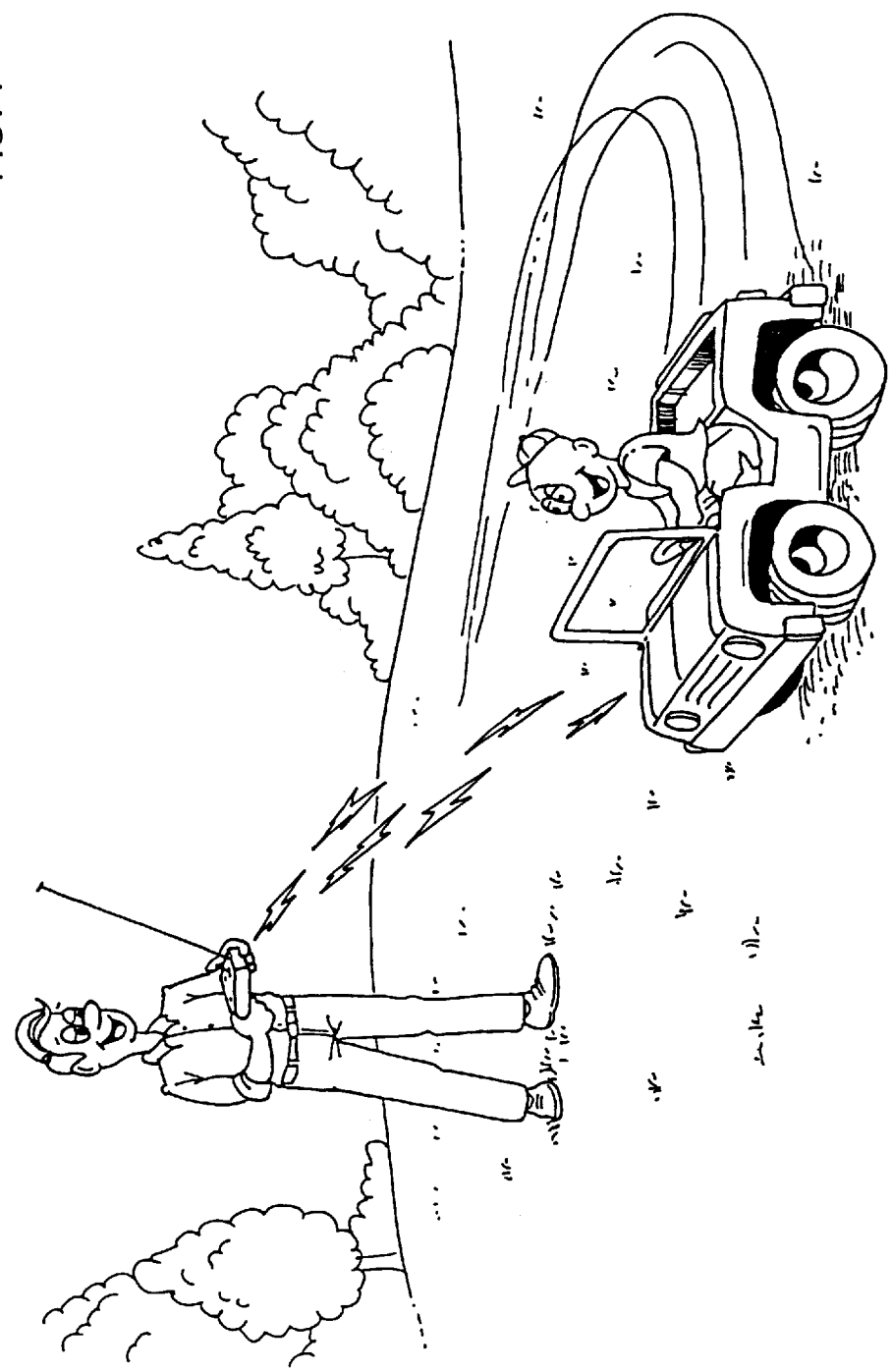
FIG. 1 and FIG. 2 illustrate the primary benefits of the present invention, specifically.
Figure 2:
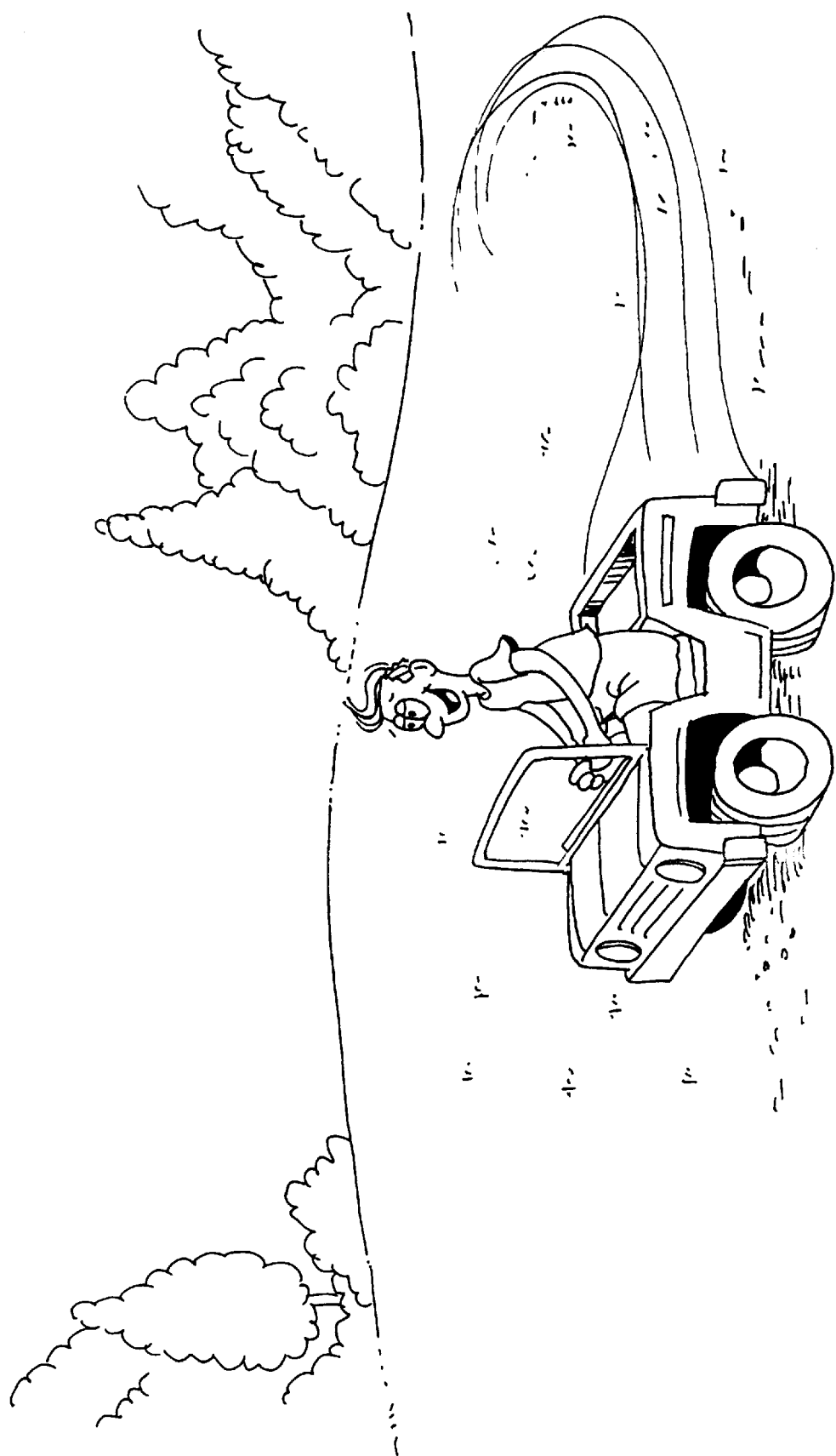
Figure 3:
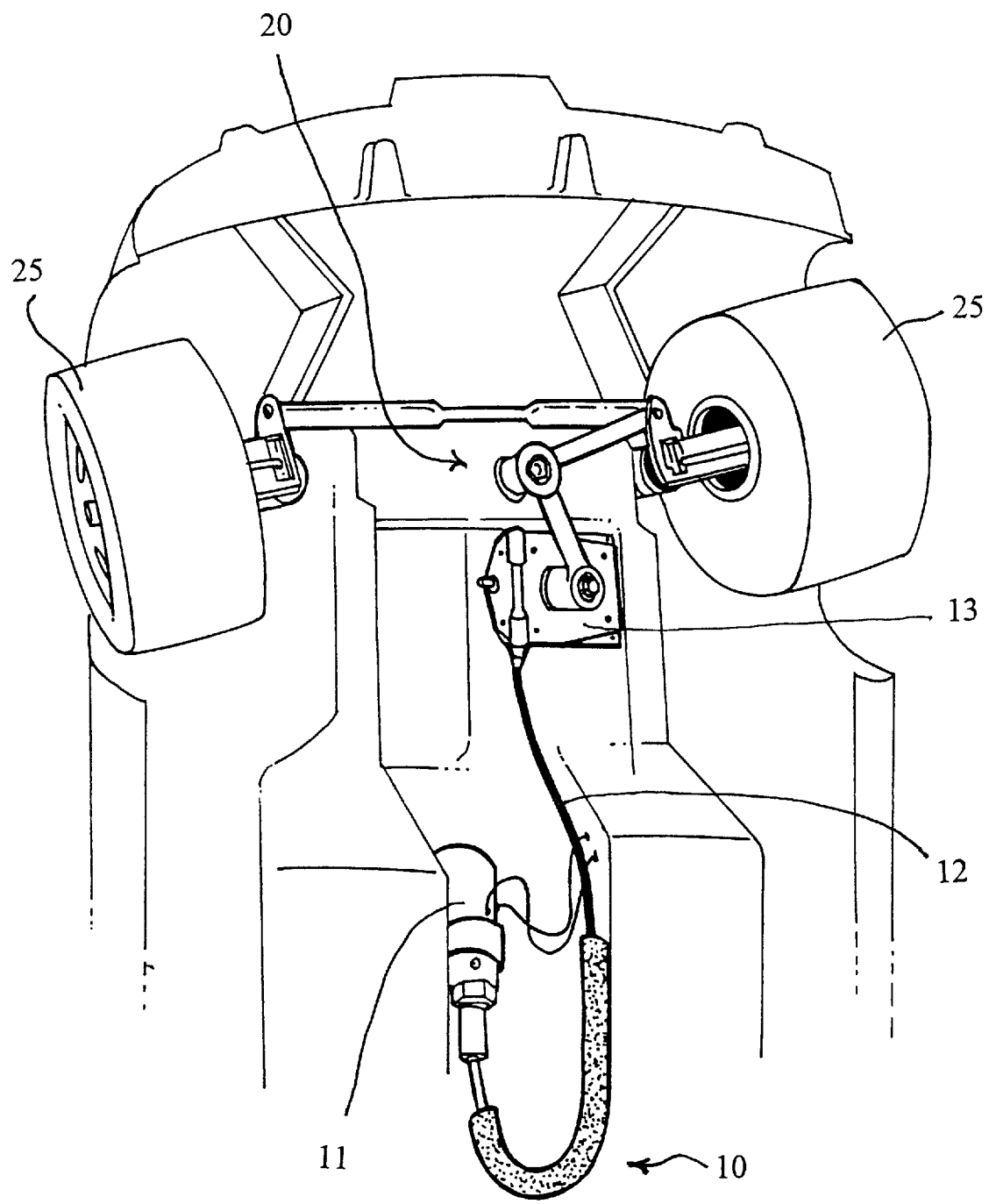
FIG. 3 shows a first embodiment of the remote control steering mechanism of the present invention.
Figure 4:
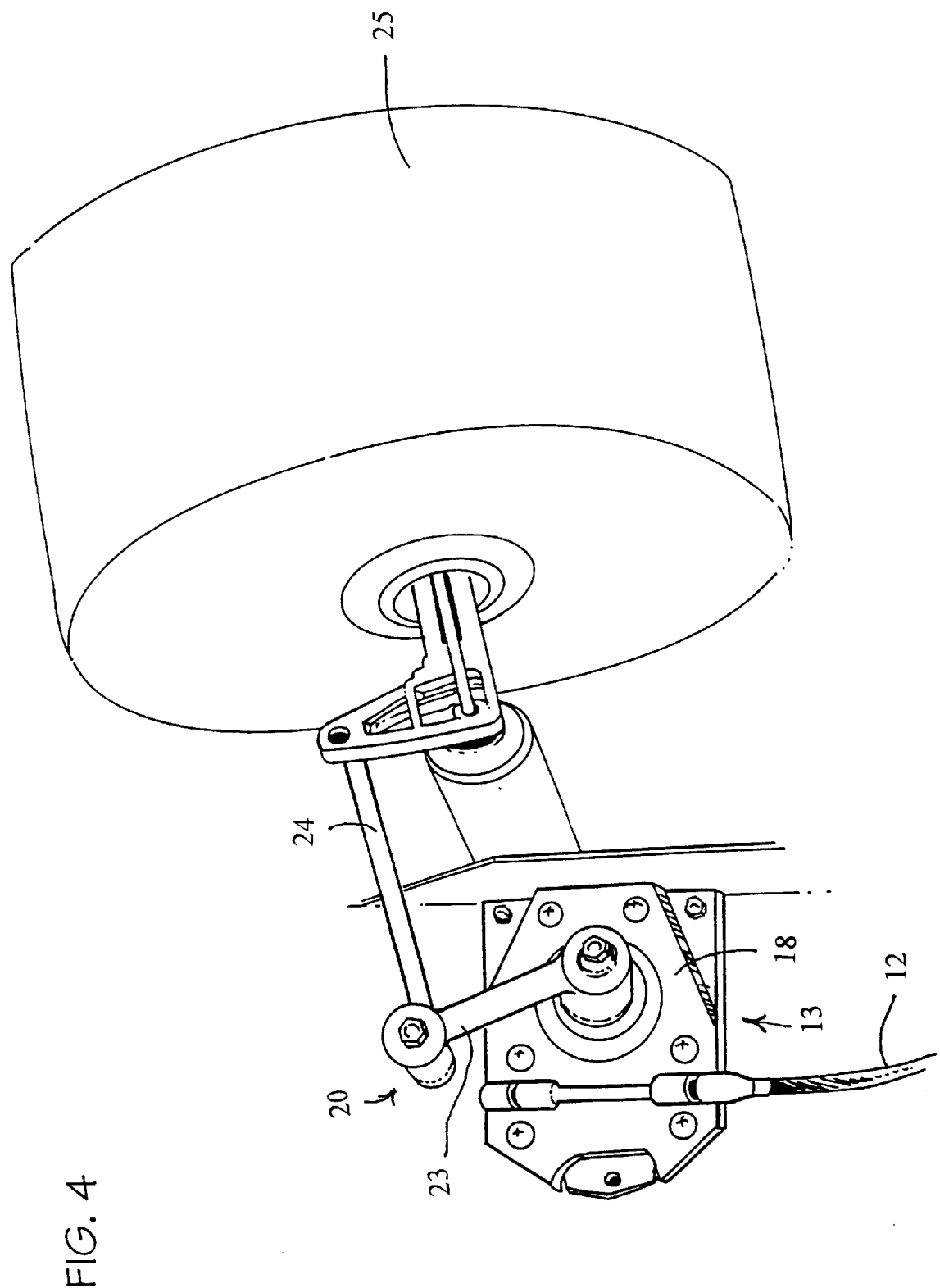
FIG. 4 is a more detailed enlargement of the steering mechanism of the first embodiment of the present invention.
Figure 5:
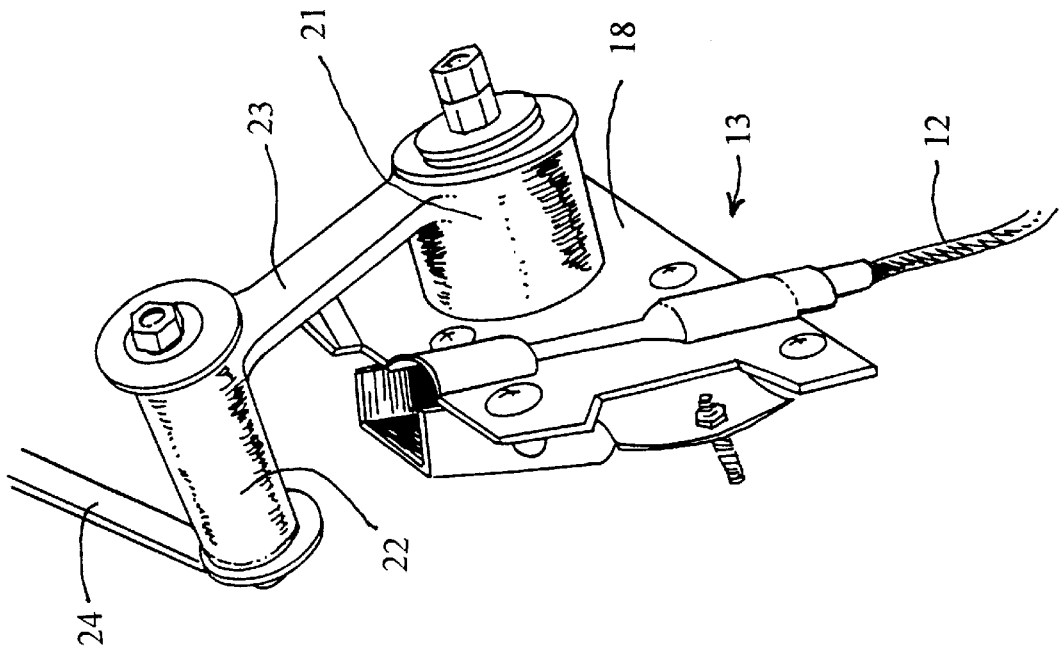
FIG. 5 is an oblique side view of the first embodiment of the present invention.

Referring now to the drawings, a riding toy vehicle 1 in which an adult may control steering and drive would be useful to increase the amount of shared time the adult spends with the child. Additionally, a remotely controlled riding toy vehicle would allow infants and very young children, ranging from 1 to 3 years of age, to use and play with the riding toy vehicle. Furthermore, convertibility of the riding toy vehicle from a first, remotely controlled, mode as illustrated in FIG. 1, to a second, occupant or rider controlled, mode as illustrated in FIG. 2 would extend the useful life span of the riding toy vehicle by allowing individual play by a child as he/she matures, typically between 3 to 7 years of age.

The present invention is also useful for allowing parents to play with mentally challenged children by allowing the child to ride the toy vehicle while the parent remotely controls steering and drive motors.

In a first preferred embodiment of the present invention, a steering assembly 10 for remotely controlling the riding toy vehicle 1, is attached to an underside of the riding toy vehicle 1. The steering assembly 10 comprises a steering motor 11, a torque transfer cable 12, a steering gear assembly 13, and a steering armature 20.

The steering motor 11, which is well known in the arts, is electrically connected to an electrical circuit 14 including a remote control steering actuator 15, a power source 16 and a switch 17. The remote control steering actuator 15 receives radio frequency signals that determine steering motor activation and direction. That is, a radio frequency signal transmitted from a remote controller 2, and received by the remote control steering actuator 15, determines whether the steering motor 11 runs forward or in reverse. Additionally, the signal determines the steering motor speed. The switch 17 disables the remote control capabilities of the present invention and thereby converts the remote control riding toy vehicle 10 to the second, rider controlled, mode of operation.

The torque transfer cable 12 connects the steering motor 11 at a first end to the steering gear assembly at a second end. This allows the steering motor 11 to be attached at a site removed from the steering gear assembly 13. Alternatively, the torque transfer cable 12 may be omitted from the present invention, and the steering motor 11 would then be directly connected to the steering gear assembly 13, or even function as the steering gear assembly 13.

Figure 8:
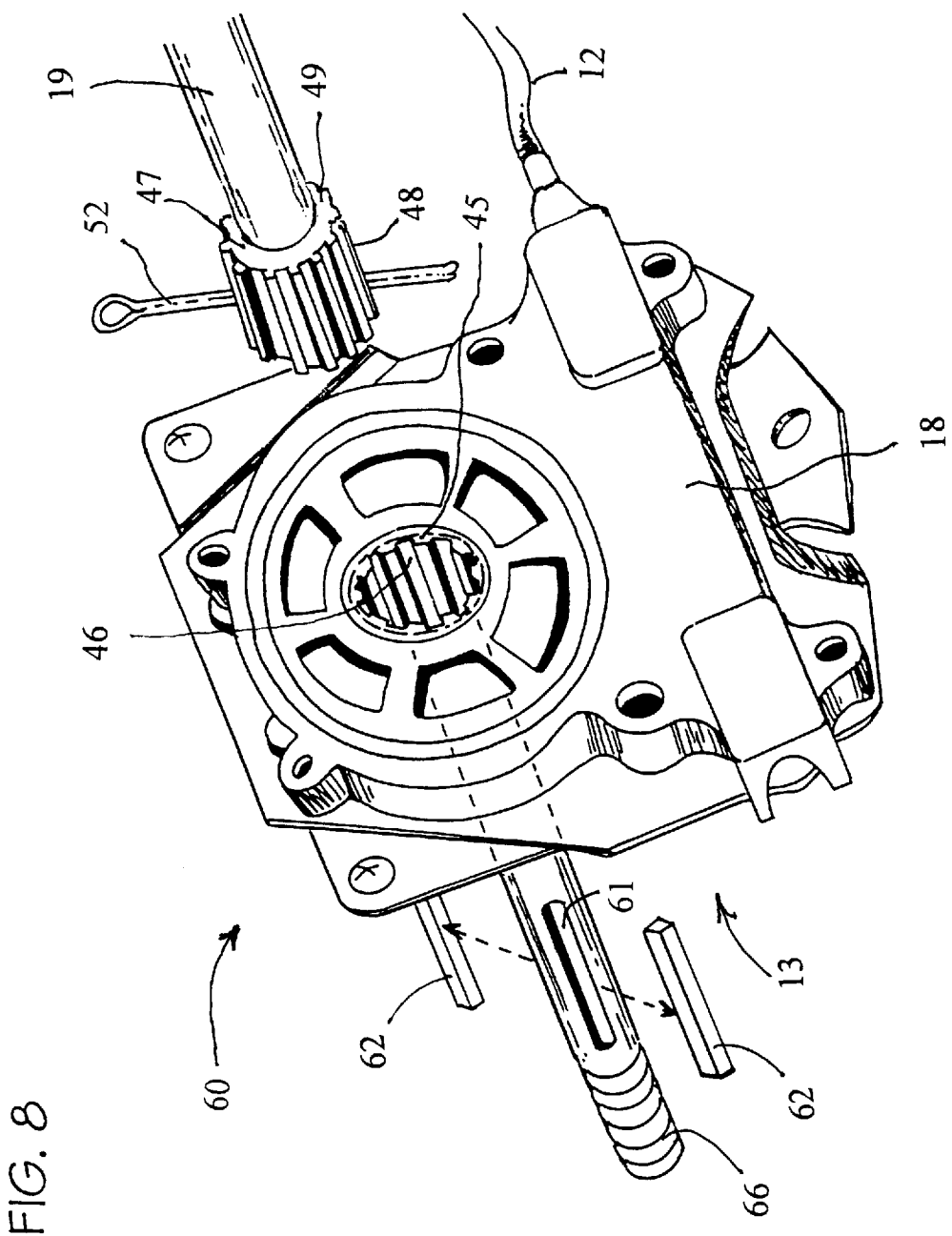
FIG. 8 depicts the underside of the second preferred embodiment with the steering column and part of an engagement gear cut away.
Figure 9:
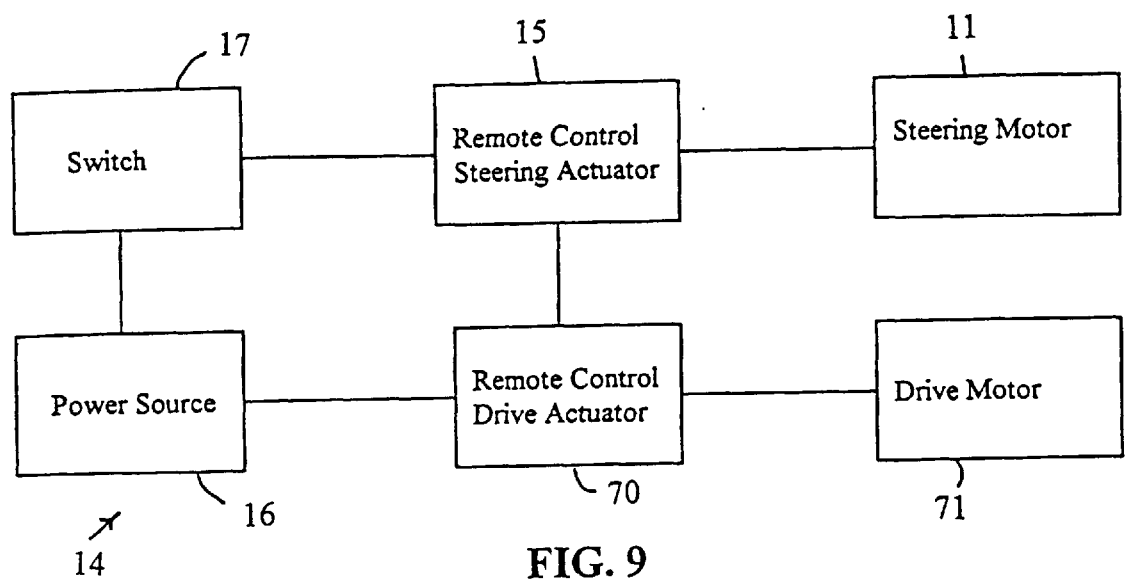
FIG. 9 is a block diagram of the radio frequency control portion of the electrical circuit of the present invention.

The steering gear assembly 13, which is attached to the second end of the torque transfer cable 12, transfers torque, provided by the steering motor 11 through the torque transfer cable 12, to the steering gear assembly 13 through an internal gear 45 (shown in FIG. 8) located within an outer housing 18 of the steering gear assembly 13.

The steering armature 20 comprises a first body portion 21, a second body portion 22, a first arm 23 connected at one end to the first body portion 21 and connected at a remaining end to the second body portion 22, and a second arm 24 pivotally connected at a first end to the second body portion 22 and pivotally connected at a second end to a pair of front wheels 25 provided by the riding toy vehicle 1. The first body portion 21 has a bottom, toothed section 45, which engages the internal gear of the steering gear assembly 13, and a top section 26 which is connected the one end of the first arm 23 of the steering armature 20.

In the first preferred embodiment, the body portions 21, 22 are cylindrical in shape, but may be other shapes and still fall within the scope of the present invention.

In use, the remote controller 2 transmits the radio frequency signal to the remote control steering actuator 15. The remote control steering actuator 15 electrically runs the steering motor 11. The torque provided by the steering motor 11 is transmitted by the torque transfer cable 12 to the steering gear assembly 13, thereby turning the internal gear 45. The turning of the internal gear 45 then rotates the first body portion 21 of the steering armature 20 about the axis of the internal gear 45. This rotation of the first body portion 21 forces the second body portion 22 to travel along an arc of a circle defined by the radius of the first arm 23 and having the first body portion 21 in the circle center. The pivotal coupling of the second arm 24 to the second body portion 22, in conjunction with the pivotal coupling of the second arm 24 to the pair of front wheels 25 provided by the riding toy vehicle 1, changes the orientation of the pair of front wheels 25, thus providing remotely controlled steering capabilities. Running the steering motor 11 in one direction will turn the riding toy vehicle 1 to the left, while running the steering motor 11 in the opposite direction will turn the riding toy vehicle 1 to the right.

Figure 6:
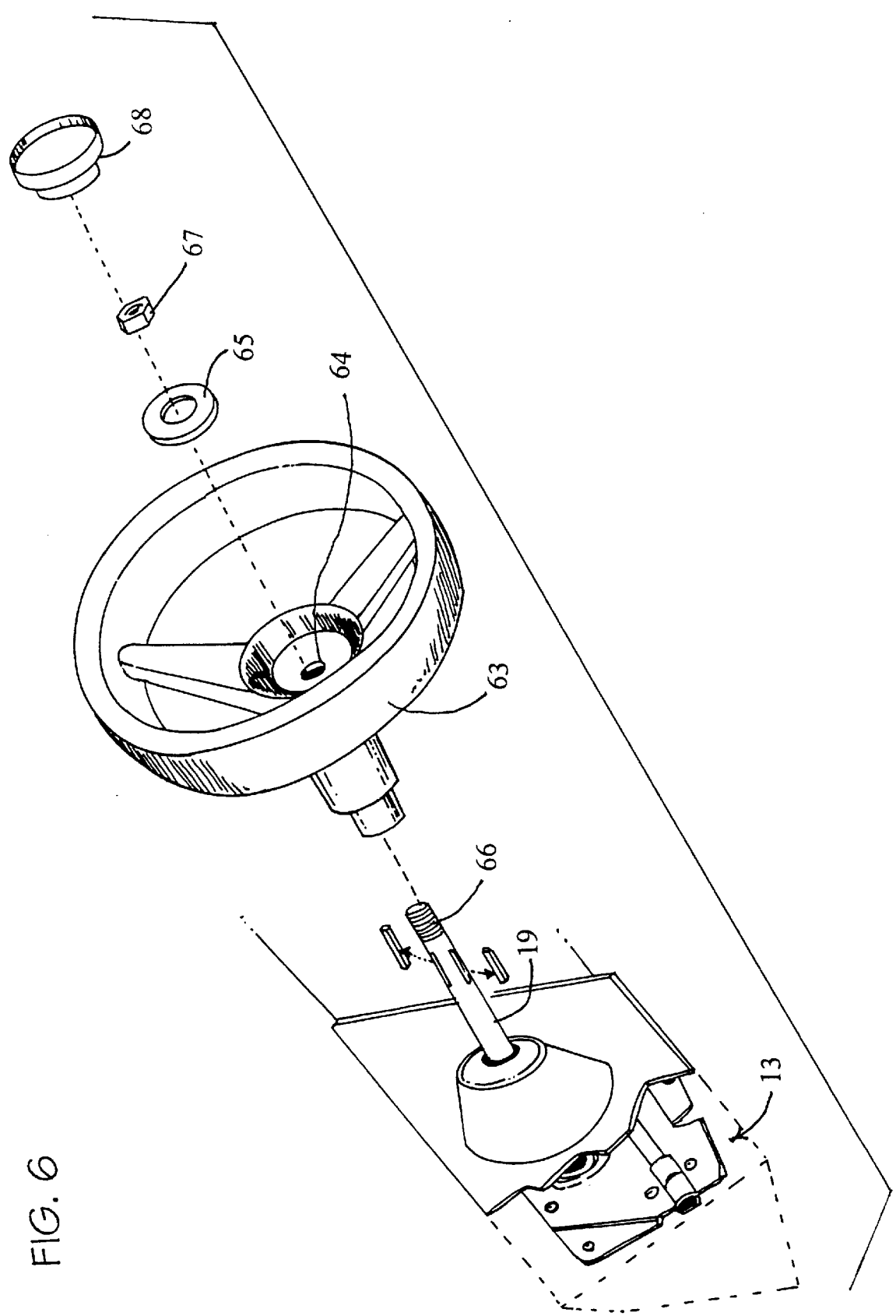
FIG. 6 illustrates, in an exploded oblique view, a steering disabling assembly of the riding toy vehicle. Also shown is the placement of a second preferred embodiment of remotely controlled steering of the present invention.
Figure 7:
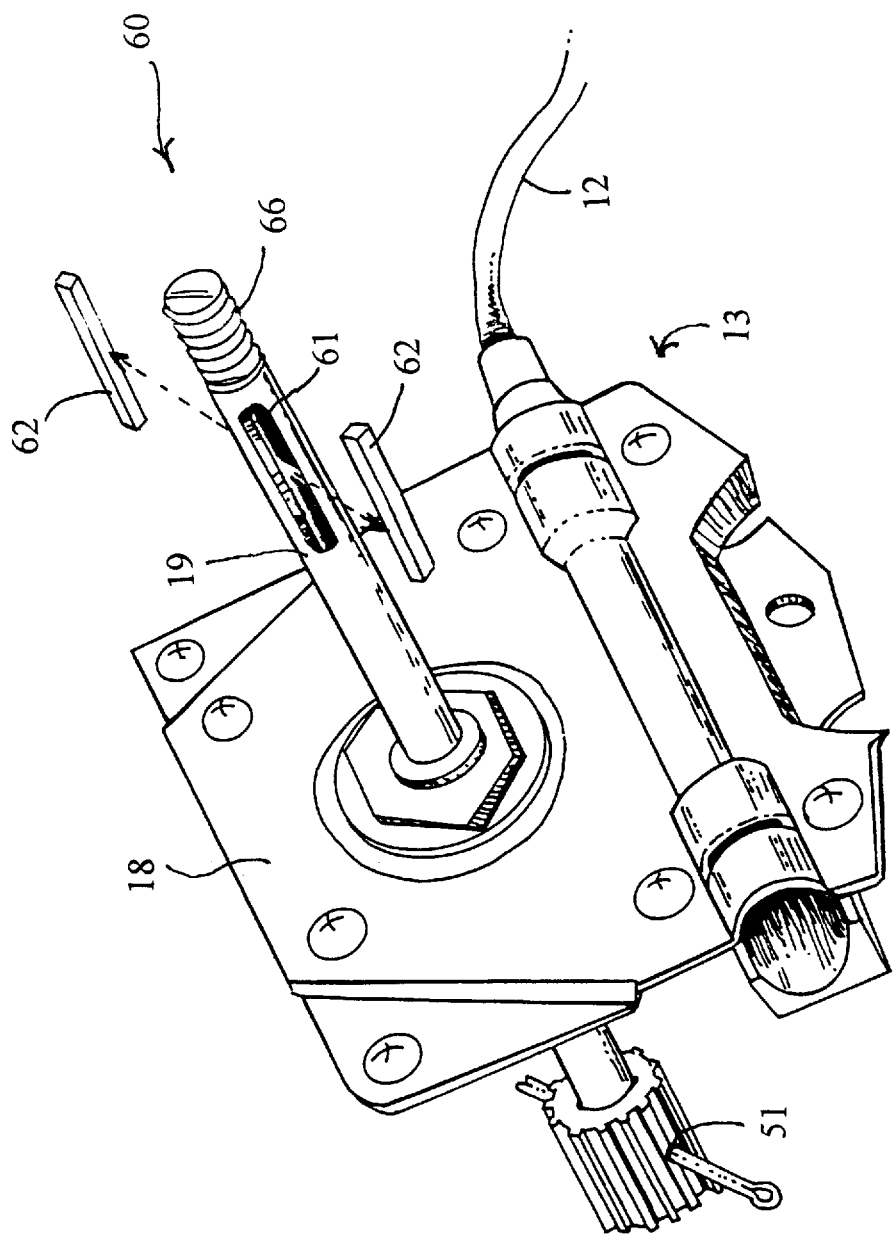
FIG. 7 depicts the second preferred embodiment of the present invention, including the steering disabling assembly.

In a second preferred embodiment of the present invention, the steering assembly 10 for remotely controlling the riding toy vehicle 1, is attached to a steering column 19 of the riding toy vehicle 1. The steering assembly 10 comprises a steering motor 11, a torque transfer cable 12, a steering gear assembly 13, and the steering column 19. FIG. 6 displays one possible location for the steering assembly 10 of the second preferred embodiment, immediately behind a dashboard of the riding toy vehicle 1.

The steering motor 11 and torque transfer cable 12 of the second preferred embodiment are identical to those of the first preferred embodiment.

The steering gear assembly 13 of the second preferred embodiment comprises the external gear housing 18 and the internal gear 45 located within the external gear housing 18. The internal gear 45 is connected to the torque transfer cable 12 at an outside diameter and has a toothed axial aperture 46. The steering gear assembly 13 is coupled to the steering column 19 through a coupling gear 47. The coupling gear 47 has a toothed external surface 48 which intermeshes within the toothed axial aperture 46 of the internal gear 45 of the steering gear assembly 13. The coupling gear 45 has an axial aperture or channel 49 which receives the steering column 19. Penetrating the coupling gear 47 and transverse to axial aperture 49 is a first linking aperture 50 which is capable of coaxially lining up with a transverse linking aperture 51 located on the steering column 19. Insertion of a pin 52 through the first and transverse linking apertures 50, 51 links the coupling gear 47 to the steering column 19.

In use, the remote controller 2 transmits the radio frequency signal to the remote control steering actuator 15. The remote control steering actuator 15 electrically runs the steering motor 11. The torque provided by the steering motor 11 is transmitted by the torque transfer cable 12 to the steering gear assembly 13, thereby turning the internal gear 45. The turning of the internal gear 45 is transferred to the steering column 19 through the coupling gear 47. Running the steering motor 11 in one direction will turn the riding toy vehicle 1 to the left, while running the steering motor 11 in the opposite direction will turn the riding toy vehicle 1 to the right.

Rider controlled steering of both the first and second embodiments is provided by setting the switch 17 to a remote control disabling position and including a steering disabling assembly 60. The steering disabling assembly 60 comprises the steering column 19, at least one indentation 61 for receiving a corresponding at least one shaft key 62, and a steering wheel 63 which an axial aperture 64 for receiving the steering column 19, and further having at least one groove sized to receive the corresponding at least one shaft key 62. The corresponding at least one shaft key 62 effectively couples the steering wheel 63 to the steering column 19. By removing the at least one shaft key 62, the steering gear assembly 13 is decoupled from the steering column 19 and does not interfere with the steering assembly 10. The steering wheel 63 can be secured to the steering column 19 by placing a washer 65 over a threaded end 66 of the steering column 19 and rotationally attaching a nut 67 to the threaded end 66 of the steering column 19. This may then be hidden from view with a cap 68 placed over the washer 65 and nut 67.

Furthermore, forward and reverse drive control is controlled in both the first and second preferred embodiments by electrically connecting a remote control drive actuator 70 to a drive assembly comprising an electrically driven drive motor 71 coupled to a pair of rear wheels provided by the riding toy vehicle 1. The remote control drive actuator 70 receives a second radio frequency signal from the remote controller 2, which determines the drive direction, forward or reverse. Furthermore, the remote control drive actuator 70 is electrically connected to the power source 16 and switch 17 that disables the remote control capabilities of the present invention and thereby converts the riding toy vehicle 1 to the second mode of operation. Alternately, the remote control drive actuator 70 may be electrically connected to a second switch, battery or both.

It is understood that those skilled in the art may conceive modifications and/or variations to the specific embodiments shown and described herein. Any such modifications or variations which fall within the purview of this description are intended to be included therein as well. It is understood that the description herein in intended to be illustrative only and is not intended to be limitative. Rather, the scope of the invention described herein is limited only by the claims appended hereto.

What is claimed is:

1. A toy apparatus which comprises:
   a) a toy vehicle;
   b) an electrical circuit in the toy vehicle having a power source and a remote control steering actuator and a remote control drive actuator;
   c) a remotely controllable steering assembly attached to the toy vehicle and electrically connected to the remote control steering actuator of the electrical circuit said steering assembly comprising:
      i. a steering motor;
      ii. a torque transfer cable connected at a first end to the steering motor;
      iii. a steering gear assembly connected to a second end of the torque transfer cable; and
      iv. a steering column connected to a pair of front wheels on the toy vehicle and connected axially to the steering gear assembly; and
   d) a remotely controllable drive assembly attached to the toy vehicle and electrically connected to the remote control drive actuator of the electrical circuit; and
   e) a remote controller for transmitting radio frequency signals to be received by the remote control steering actuator and remote control drive actuator thereby remotely controlling the steering assembly and the drive assembly.

2. A toy apparatus as in claim 1 wherein the steering assembly further comprises:
   a) a steering motor;
   b) a torque transfer cable connected at a first end to the steering motor;
   c) a steering gear assembly connected to a second end of the torque transfer cable; and
   d) a steering armature connected between the steering gear assembly and a pair of front wheels on the toy vehicle.

3. A toy apparatus as in claim 2 wherein the steering armature further comprises:
   a) a first body portion;
   b) a second body portion;
   c) a first arm connected at one end to the first body portion and at a remaining end to the second body portion; and
   d) a second arm pivotally connecting the second body portion at a first end and pivotally connected at a second end to the pair of front wheels on the toy vehicle.

4. A toy apparatus as in claim 1 wherein the steering gear assembly further comprises:
   a) an external gear housing;
   b) an internal gear located with the external gear housing and connected to the torque transfer cable at an outside diameter and having a toothed axial aperture;
   c) a coupling gear which has an external toothed surface which intermeshes within the toothed axial aperture of the internal gear and further has an axial channel which receives the steering column, furthermore, the coupling gear has a transverse linking aperture which fully penetrates the coupling gear; and
   wherein the steering column further has a transverse linking aperture that is capable of coaxially lining up with the linking aperture of the coupling gear;
   whereby a pin is inserted through the linking aperture and the steering column transverse aperture to effectively couple the coupling gear to the steering column.

5. A toy apparatus as in claim 1 wherein the electrical circuit further has a switch whereby the riding toy vehicle is converted from a remotely controlled toy vehicle to a rider controlled toy vehicle.

6. A toy apparatus as in claim 5 wherein the steering assembly further comprises:
   a steering armature connected between the steering gear assembly and a pair of front wheels on the toy vehicle.

7. A toy apparatus as in claim 6 wherein the steering armature further comprises:
   a) a first body portion;
   b) a second body portion;
   c) a first arm connected at one end to the first body portion and at a remaining end to the second body portion; and
   d) a second arm pivotally connecting the second body portion at a first end and pivotally connected at a second end to the pair of front wheels on the toy vehicle.

8. A toy apparatus as in claim 5 wherein the steering gear assembly further comprises:
   a) an external gear housing;
   b) an internal gear located with the external gear housing and connected to the torque transfer cable at an outside diameter and having a toothed axial aperture;
   c) a coupling gear which has an external toothed surface which intermeshes within the toothed axial aperture of the internal gear and further has an axial channel which receives the steering column, furthermore, the coupling gear has a transverse linking aperture which fully penetrates the coupling gear; and
   wherein the steering column further has a transverse linking aperture that is capable of coaxially lining up with the lining aperture of the coupling gear; and
   whereby a pin is inserted through the linking aperture and the steering column transverse aperture to effectively couple the coupling gear to the steering column.

9. A toy apparatus as in claim 5 wherein the steering gear assembly further comprises:
   a) an external gear housing;
   b) an internal gear located with the external gear housing and connected to the torque transfer cable at an outside diameter and having a toothed axial aperture; and
   c) the steering has an external toothed surface which intermeshes within the toothed axial aperture of the internal gear.

10. A toy apparatus as in claim 5 wherein the toy vehicle further includes a steering disabling assembly comprising a steering column having at least one indentation for receiving a corresponding at least one shaft key, and a steering wheel which has an axial aperture for receiving the steering column, and further having at least one groove sized to receive the corresponding at least one shaft key.

11. A toy apparatus as in claim 7 wherein the toy vehicle further includes a steering disabling assembly comprising a steering column having at least one indentation for receiving a corresponding at least one shaft key, and a steering wheel which has an axial aperture for receiving the steering column, and further having at least one groove sized to receive the corresponding at least one shaft key.

12. A toy apparatus as in claim 9 wherein the toy vehicle further includes a steering disabling assembly comprising a steering column having at least one indentation for receiving a corresponding at least one shaft key, and a steering wheel which has an axial aperture for receiving the steering column, and further having at least one groove sized to receive the corresponding at least one shaft key.

13. A riding toy apparatus which comprises:
    a) a riding toy vehicle;
    b) an electrical circuit in the toy vehicle having a power source and a remote control steering actuator and a remote control drive actuator;
    c) a remotely controllable steering assembly attached to the riding toy vehicle and electrically connected to the remote control steering actuator of the electrical circuit;
    d) a remotely controllable drive assembly attached to the riding toy vehicle and electrically connected to the remote control drive actuator of the electrical circuit;
    e) a steering disabling assembly comprising a steering column having at least one indentation for receiving a corresponding at least one shaft key, and a steering wheel which has an axial aperture for receiving the steering column, and further having at least one groove sized to receive the corresponding at least one shaft key; and
    f) a remote controller for transmitting radio frequency signals to be received by the remote control steering actuator and remote control drive actuator thereby remotely controlling the steering assembly and the drive assembly.

14. A riding toy apparatus as in claim 13 wherein the steering assembly further comprises:
    a) a steering motor;
    b) a torque transfer cable connected at a first end to the steering motor;
    c) a steering gear assembly connected to a second end of the torque transfer cable; and
    d) a steering armature connecting the steering gear assembly to a pair of front wheels on the toy vehicle comprising:
        i. a first body portion;
        ii. a second body portion;
        iii. a first arm connected at one end to the first body portion and at a remaining end to the second body portion; and
        iv. a second arm pivotally connecting the second body portion at a first end and pivotally connected at a second end to the pair of front wheels on the toy vehicle.

15. A riding toy apparatus which comprises:
    a) a riding toy vehicle;
    b) an electrical circuit in the toy vehicle having a power source and a remote control steering actuator and a remote control drive actuator;
    c) a remotely controllable steering assembly attached to the riding toy vehicle and electrically connected to the remote control steering actuator of the electrical circuit, said steering assembly comprising:
        i) a steering motor;
        ii) a torque transfer cable connected at a first end to the steering motor;
        iii) a steering gear assembly connected to a second end of the torque transfer cable; and
        iv) a steering column connected to a pair of front wheels on the riding toy vehicle and connected axially to the steering gear assembly;
    d) a remotely controllable drive assembly attached to the riding toy vehicle and electrically connected to the remote control drive actuator of the electrical circuit;
    e) a steering disabling assembly comprising a steering column having at least one indentation for receiving a corresponding at least one shaft key, and a steering wheel which has an axial aperture for receiving the steering column, and further having at least one groove sized to receive the corresponding at least one shaft key; and
    f) a remote controller for transmitting radio frequency signals to be received by the remote control steering actuator and remote control drive actuator thereby remotely controlling the steering assembly and the drive assembly.

16. A riding toy apparatus as in claim 15 wherein the steering gear assembly further comprises:
    a) an external gear housing;
    b) an internal gear located with the external gear housing and connected to the torque transfer cable at an outside diameter and having a toothed axial aperture;
    c) a coupling gear which has an external toothed surface which intermeshes within the toothed axial aperture of the internal gear and further has an axial channel which receives the steering column, furthermore, the coupling gear has a transverse linking aperture which fully penetrates the coupling gear; and
    wherein the steering column further has a transverse linking aperture that is capable of coaxially lining up with the lining aperture of the coupling gear; and
    whereby a pin is inserted through the linking aperture and the steering column transverse aperture to effectively couple the coupling gear to the steering column.

* * * * *